United States Patent
Oddsen, Jr.

(10) Patent No.: US 7,246,780 B2
(45) Date of Patent: Jul. 24, 2007

(54) STACKABLE MULTIPLE SUPPORT ARM FOR ELECTRONIC DEVICES

(75) Inventor: Odd N. Oddsen, Jr., Easton, PA (US)

(73) Assignee: Innovative Office Products, Inc., Easton, PA (US)

( * ) Notice: Subject to any disclaimer, the term of this patent is extended or adjusted under 35 U.S.C. 154(b) by 0 days.

(21) Appl. No.: 10/418,233

(22) Filed: Apr. 17, 2003

(65) Prior Publication Data

US 2004/0035987 A1    Feb. 26, 2004

Related U.S. Application Data

(60) Provisional application No. 60/377,049, filed on May 1, 2002.

(51) Int. Cl.
*E04G 3/00* (2006.01)

(52) U.S. Cl. ............... 248/282.1; 248/917; 248/125.7; 211/26

(58) Field of Classification Search ............... 248/458, 248/131, 274.1, 276.1, 278.1, 281.11, 282.1, 248/125.7, 917; 211/53, 163, 166, 26, 110
See application file for complete search history.

(56) References Cited

U.S. PATENT DOCUMENTS

| | | | | |
|---|---|---|---|---|
| 2,692,689 A * | 10/1954 | Wynne, Sr. | ................. | 211/165 |
| 2,883,066 A * | 4/1959 | Pratt | ....................... | 220/23.83 |
| 4,971,234 A * | 11/1990 | Hay | ....................... | 224/42.32 |
| 5,061,018 A * | 10/1991 | Pederson et al. | ........... | 312/209 |
| 5,996,819 A * | 12/1999 | Klein | ....................... | 211/85.14 |
| 6,409,134 B1 * | 6/2002 | Oddsen, Jr. | .............. | 248/274.1 |
| 6,419,332 B1 * | 7/2002 | Caldwell et al. | ............. | 312/285 |
| 6,478,274 B1 * | 11/2002 | Oddsen, Jr. | .............. | 248/274.1 |
| D476,509 S * | 7/2003 | Orsino et al. | ................ | D6/477 |
| 6,595,377 B1 * | 7/2003 | Hetu | ....................... | 211/85.23 |
| 6,695,270 B1 * | 2/2004 | Smed | ...................... | 248/274.1 |

* cited by examiner

*Primary Examiner*—Amy J. Sterling
*Assistant Examiner*—Steven M. Marsh
(74) *Attorney, Agent, or Firm*—Lerner, David, Littenberg, Krumholz & Mentlik, LLP (57) ABSTRACT

A mounting apparatus includes a plurality of arm mounts which are rotationally coupled in a vertical column in end to end relationship to provide a nested arrangement thereof. A support arm is attached to each of the arm mounts to which an electronic device is attached. The arm mounts are secured in nested arrangement between a pair of mounting plates which engage the ends of an elongated shield at least partially surrounding the arm mounts.

33 Claims, 5 Drawing Sheets

STACKABLE MULTIPLE SUPPORT ARM FOR ELECTRONIC DEVICES

CROSS REFERENCE TO RELATED APPLICATIONS

The present application claims the benefit of Provisional Application No. 60/377,049, filed on May 1, 2002, entitled "Stackable Multiple Support Arm for Electronic Devices", the disclosure of which is incorporated herein by reference.

The present invention relates in general to a modular mounting system for stacking a plurality of adjustable mounting or support arms in a vertical column for supporting an electronic device.

Various electronic devices such as LCD flat screen displays, CRT displays, computer keyboards, laptop computers, plasma displays and the like are used in a variety of residential, commercial and industrial applications. By way of example, an LCD display is often coupled to a computer or server for displaying information such as text and/or graphic images. There are a number of applications where it is desirable to mount two or more flat screen displays or other electronic devices in close proximity to each other for viewing or use by the user.

To this end, there is known an assembly which includes a vertical pole which is adapted to be secured to a supporting surface. One or more extension arms can be coupled to the pole at various spaced apart locations along the poles' vertical longitudinal axis. The free end of the extension arms can support a tilter assembly to which a flat screen display is attached. The number of extension arms and corresponding electronic devices to be attached thereto is limited by the length of the support pole. However, where a longer support pole is provided, it may not always be needed thereby becoming an unnecessary obstruction.

There is therefore an unsolved need for a mounting assembly which is modular in design for accommodating a plurality of electronic devices to be supported thereby.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

SUMMARY OF THE INVENTION

In accordance with one embodiment of the present invention, there is disclosed a mounting apparatus for supporting a plurality of electronic devices, the apparatus comprising a plurality of arm mounts rotationally nested together in an end-to-end collinear alignment; securing means for securing the plurality of arm mounts in nested arrangement; and support means coupled to each of the arm mounts for supporting an electronic device.

In the mounting apparatus, each of the arm mounts includes a body having a first end and a second end, the first end having a bore therein and the second end having a rod extending therefrom, the rod received within the bore of an underlying adjacent arm mount.

The securing means includes a top mounting plate having a first boss extending therefrom and a bottom mounting plate having a second boss extending therefrom, wherein the top mounting plate is positioned overlying the top most arm mounting plate in the nested arrangement thereof and the bottom mounting plate is positioned underlying the bottom most arm mount in the nested arrangement thereof, the first boss received within the bore of an underlying adjacent arm mount and the second boss having a bore therein receiving the rod of an overlying adjacent arm mount.

The securing means further includes an elongated shield at least partially surrounding the nested arrangement of the arm mounts, the shield having one end engaged by the top mounting plate and its other end engaged by the bottom mounting plate. The securing means still further includes a pair of rods having one end attached to the bottom mounting plate and its other end attached to the top mounting plate, and optionally, the shield includes a pair of spaced apart tubes through which the rods extend between the top and bottom mounting plates.

In accordance with another embodiment of the present invention, there is disclosed a mounting apparatus for supporting a plurality of electronic devices, the apparatus comprising top and bottom vertically spaced apart mounting plates; a plurality of arm mounts rotationally nested together in collinear alignment between the top and bottom mounting plates; a shield at least partially surrounding the arm mounts, the shield having one end engaged by the top mount and the other end engaged by the bottom mount; and a plurality of support arms having one end thereof coupled to a perspective one of the arm mounts and the other end thereof adapted for supporting an electronic device.

In accordance with another embodiment of the present invention, there is disclosed a mounting apparatus for vertically supporting a plurality of electronic devices, the apparatus comprising a plurality of arm mounts rotationally nested together in an end-to-end collinear alignment, each of the arm mounts comprises a body having a first end and a second end, the first end having a bore therein and the second end having a rod extending therefrom, the rod received within the bore of an underlying adjacent arm mount, and a mounting bracket attached to the body of each of the arm mounts adapted for attachment of the support arm thereto.

In accordance with another embodiment of the present invention, there is disclosed a mounting apparatus for supporting a plurality of electronic devices in a vertical stack, the apparatus comprising a top mounting plating having a downwardly depending hollow boss; a bottom mounting plate vertically spaced from the top mounting plate having an upwardly depending boss; a plurality of arm mounts vertically nested in collinear alignment between the top and bottom mounting plate forming a nested column thereof, each the arm mount including a hollow body and a downwardly depending rod, the rod having a notch extending therethrough in communication with an opening extending through an adjacent portion of the body of the arm mount, the notch and the opening adapted to permit passage of a cable therethrough extending from an electronic device mounted to the apparatus, wherein a plurality of the arm mounts are rotationally nested with respect to each other by the rod of one arm mount being received with the hollow body of an underlying arm mount, the rod of a first one of the arm mounts in the nested column being rotationally received within the hollow boss of the bottom mounting plate and the boss of the top mounting plate rotationally being received with the hollow body of a last one of the arm mounts in the nested column; a shield extending between the top and bottom mounting plates at least partially surrounding the plurality of arm mounts with the nested column; and a plurality of rods extending between the top and bottom mounting plates for securing the mounting plates, the shield and the plurality of arm mounts in assembled relationship; and a plurality of support arms having one end thereof coupled to a respective one of the arm mounts and another end adapted for supporting the electronic device.

In accordance with another embodiment of the present invention, there is disclosed a method of making a mounting apparatus for supporting a plurality of electronic devices, the method comprising nesting a plurality of arm mounts in end-to-end rotational relationship, securing the plurality of arm mounts in a nested vertical column, and attaching a supporting arm to each of the arm mounts for attaching an electronic device at one end thereof.

In accordance with another embodiment of the present invention, there is disclosed a method of making a mounting apparatus for supporting a plurality of electronic devices, the method comprising providing a plurality of arm mounts, each of the arm mounts include a body having a first end and a second end, the first end having a bore therein and the second end having a rod extending therefrom, nesting the arm mounts together in end-to-end relationship by inserting a rod from one arm mount into the bore of an underlying adjacent arm mount, securing the nested arm mounts together in a vertical column, and attaching a support arm to each of the arm mounts for attaching an electronic device thereto.

DETAILED DESCRIPTION OF THE PREFERRED EMBODIMENTS

In describing the preferred embodiments of the invention illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose.

Figure 1:
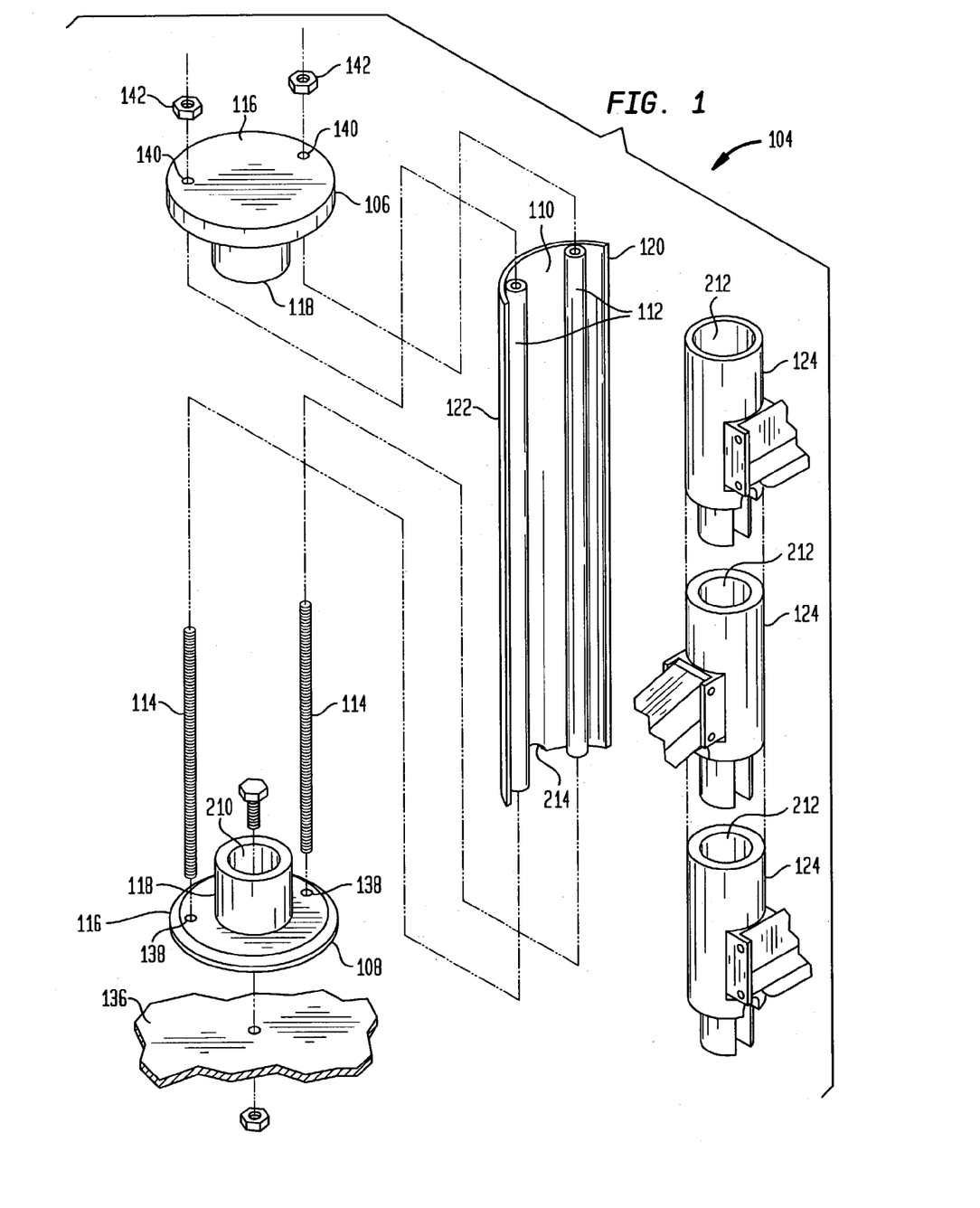
FIG. 1 is an exploded perspective unassembled view of the components of the mounting apparatus in accordance with the present invention.
Figure 5:
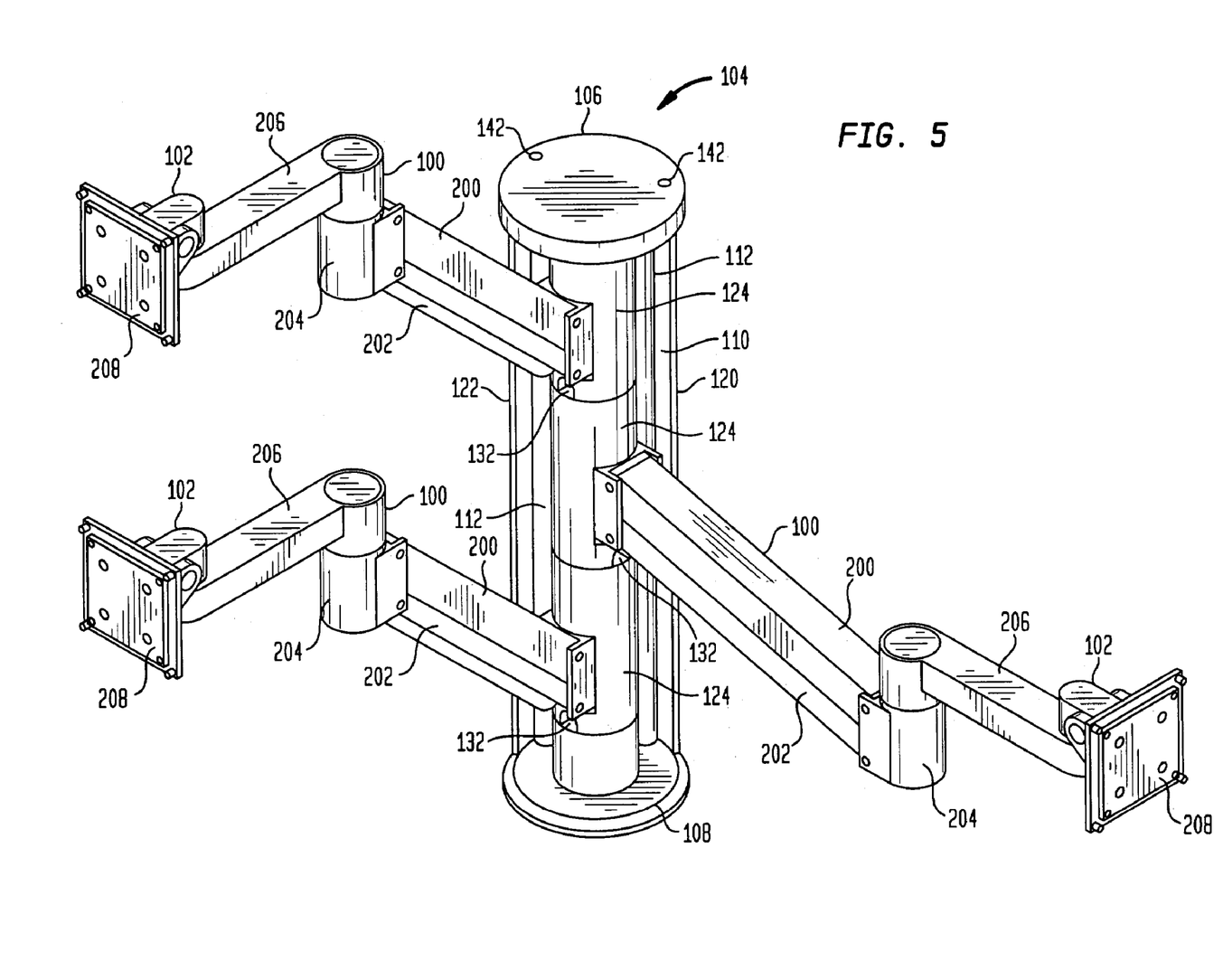
FIG. 5 is a perspective assembled view of a mounting apparatus having a plurality of extension arms attached thereto.

Referring now to the drawings, wherein like reference numerals represent like elements, there is shown in FIGS. 1 and 5 a system in the nature of a mounting apparatus for supporting a plurality of electronic devices, and generally designated by reference 104.

As best shown in FIG. 5, there is disclosed a plurality of securing means in the nature of support arm assemblies generally designated by reference 100 which are attached to the mounting apparatus 104. Suitable arm assemblies 100 for the purposes of the present invention are disclosed in Applicant's U.S. Pat. Nos. 6,478,274 and 6,409,134, the disclosures of which are incorporated herein by reference. Each arm is adapted to support an electronic device such as a liquid crystal display monitor, notebook computer, CRT display, and the like. Each of the arm assemblies 100 are generally adapted for concealing the electronic cables which are attached to the electronic device. The electronic device (not shown) can be attached to a tilter assembly 102 such as disclosed in Applicant's U.S. Pat. No. 6,505,988, the disclosure of which is incorporated herein by reference. The tilter assembly 102 allows manipulation of the orientation of the electronic device which is attached thereto.

With reference to FIGS. 1–4, the mounting apparatus of the present invention which has been generally designated by reference 104 includes a top and bottom mounting plate 106, 108, an elongated shield 110, optionally a pair of elongated hollow tubes 112 and a pair of elongated threaded rods 114 or the like. The top and bottom mounting plates 106, 108 include a base 116 from which there centrally extends from one surface a boss 118. The boss 118 of the bottom mounting plate 108 is provided with a bore 210.

Figure 2:
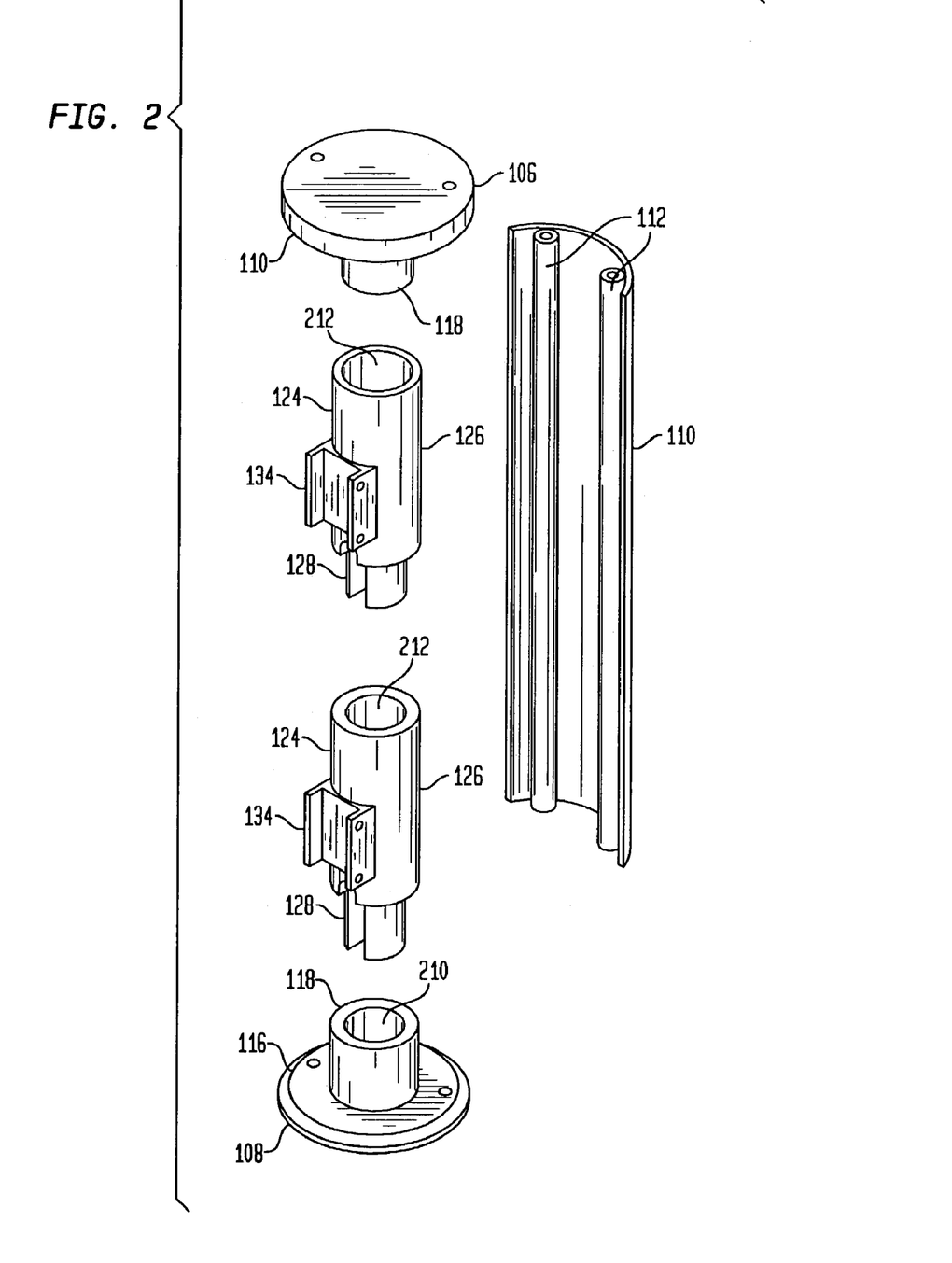
FIG. 2 is a further exploded unassembled perspective view of the mounting apparatus.

The shield 110 is constructed as an elongated C-shaped member having a predetermined radial extent defined between lateral edges 120, 122. The optional tubes 112 are hollow and extend longitudinally adjacent a respective edge 120, 122. In the preferred embodiment, the tubes 112 are bonded, integrally formed therewith or otherwise secured to the shield 110. The threaded rods 114 may be threaded over their entire length, or only at their opposing ends.

Figure 3:
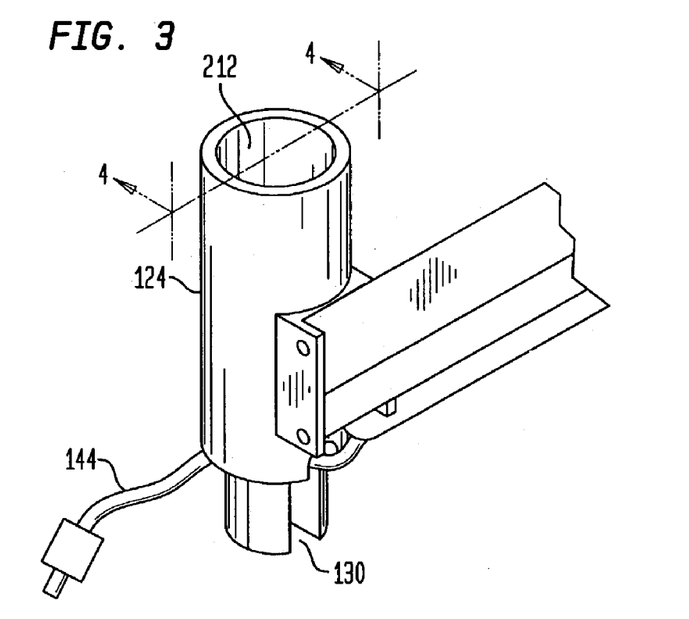
FIG. 3 is a perspective view of an arm mount.
Figure 4:
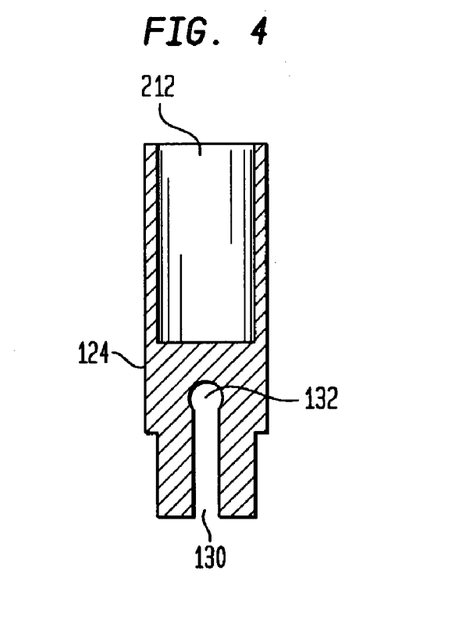
FIG. 4 is a cross-sectional view of the arm mount taken along line 4—4 in FIG. 3.

The mounting apparatus 104 includes one or more modular arm mounts 124. Each of the arm mounts 124 includes a partially hollow tubular body 126 having a bore 212 at one end thereof and from which there centrally extends from the other end thereof a rod 128 having a longitudinally extending through-notch 130. The notch 130 communicates with a throughhole 132 formed within an adjacent portion of the body 126. A mounting bracket 134 is attached to the side of the body 126 generally adjacent the hole 132.

With reference to FIGS. 1 and 5, the mounting apparatus 104 is assembled by first securing the bottom mounting plate 108 to a supporting surface 136 by any suitable means such as a bolt, screw or the like. As shown, a bolt may be positioned extending through the boss 118. The pair of threaded rods 114 are threadedly received into threaded openings 138 within the base 116 of the bottom mounting plate 108. With the threaded rods 114 extending upwardly, the shield 110 is mounted thereto by receiving the threaded rods within the tubes 112.

A first arm mount 124 is rotationally coupled to the bottom mounting plate 108 by its rod 128 being received within the bore 210 of the boss 118. A second arm mount 124 is rotationally coupled to the underlying arm mount in a similar manner. In this regard, the rod 128 of an adjacent upper arm mount 124 is received within the bore 212 within the body 126 of an underlying arm mount. In this manner, a plurality of arm mounts 124 may be stacked in a vertical column, one upon the other, in a nested arrangement. Each of the arm mounts 124 may be rotated with respect to an adjacent arm mount by virtue of its extending rod 128.

The top mounting plate 106 is secured to the uppermost arm mount 124 by its boss 118 being received within bore 212 of the underlying adjacent arm mount. The ends of the threaded rods 114 extend through or into openings 140 within the base 116 of the top mounting plate 106. The rods are secured to the top mounting plate 106 by means of a pair of nuts 142 which may be received within the openings 140.

In the alternative, the threaded rods 114 may be eliminated and replaced by screws or bolts (not shown). In this regard, the shield may be secured to the top and bottom mounting plates 106, 108 using the aforementioned fasteners which can be threadingly received within a threaded opening provided within the ends of the shield 110.

Pursuant to this arrangement, the arm mounts 124 are maintained under restraint in a vertical collinear stack between the top and bottom mounting plates 106, 108 by means of the threaded rods 114 and shield 110.

As shown in FIG. 5, the arm assembly 100 is in the nature of an extension arm as disclosed in the aforementioned patents. Briefly, each arm assembly 100 includes a pair of nested elongated channel members 200, 202 having one end pivotably coupled to a mounting bracket 134. The other end of the channel members 200, 202 are pivotably coupled to an end cap 204. A forearm extension 206 has one end pivotably coupled to the end cap 204, its other end supporting a tilter assembly 102. The electronic device (not shown) such as a flat screen display is coupled to the tilter assembly 102 via a mounting plate 208.

An arm assembly 100 is pivotally attached at one end of the channel members 200, 202 to a corresponding mounting bracket 134 using pins, screws and the like as is known from the aforementioned incorporated patents. A cable 144 from an electronic device being received from one of the arm assemblies 100 passes through the hole 132 within the arm mount 124. The hole 132 is in communication with its associated notch 130 which allows the cable to pass therethrough into the hole. In this manner, cables 144 may extend downwardly through the mounting apparatus 104 in the space generally defined between the shield 110 and spaced apart tubes 112. The cables 144 may exit centrally from an opening (214), such as provided along the bottom edge of the shield 110. Accordingly, it is to be understood that the shield 110 is adapted to hide the cables 144, as well as providing a structural backbone for the mounting apparatus 104.

The arm assemblies 100 can rotate by means of the arm mounts 124. The extent of rotation will be limited by engagement with the opposing edges 120, 122 of the shield 110. These edges may be formed with rubber bumpers or polymer strips, if so desired, thereby acting as resilient stops. It should therefore be appreciated that one or more arm mounts 124 may be assembled in co-linear alignment in accordance with the present invention. Accordingly, any number of arm mounts 124 may be stacked one on top of the other pursuant to the present invention for supporting an electronic device via an attached arm assembly 100.

Figure 6:
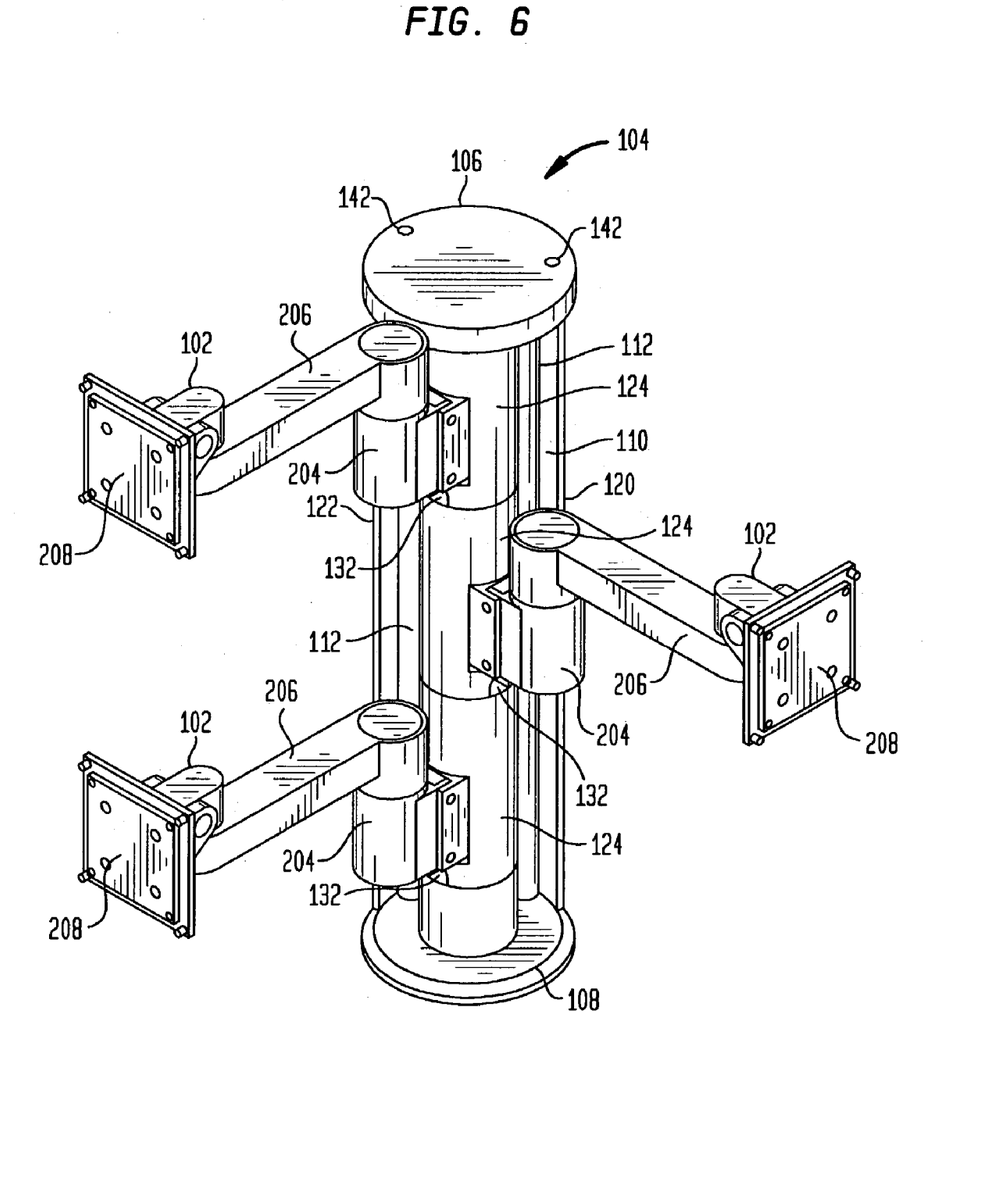
FIG. 6 is a perspective assembled view of a mounting apparatus having a plurality of forearm extensions attached thereto.

Referring to FIGS. 6, there is disclosed another embodiment of an arm assembly adapted for supporting an electronic device by means of the mounting apparatus 104. In this regard, the end cap 204 may be coupled directly to the mounting bracket 134 using suitable pins. A forearm extension 206, or other suitable member, may be rotatably coupled to the end cap 204. As previously described, an electronic device can be coupled to the forearm extension 206 by means of a tilter assembly 102. It is also contemplated that the forearm extension 206 may be eliminated, with the tilter assembly 102 being coupled directly to the end cap 204. It can therefore be appreciated that other structural elements may be used for coupling an electronic device to the mounting bracket 134.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention.

The invention claimed is:

1. A mounting apparatus for supporting a plurality of electronic devices, said apparatus comprising a plurality of arm mounts rotationally nested together in end-to-end collinear alignment; securing means for securing said plurality of arm mounts in nested arrangement; and support means coupled to each of said arm mounts for supporting an electronic device.

2. The mounting apparatus of claim 1, wherein each of said arm mounts includes a body having a first end and a second end, said first end having a bore therein and said second end having a rod extending therefrom, said rod received within the bore of an underlying adjacent arm mount.

3. The mounting apparatus of claim 2, wherein said body includes an opening extending through said body adjacent said second end.

4. The mounting apparatus of claim 3, wherein said rod includes a notch extending therethrough in communication with said opening.

5. The mounting apparatus of claim 2, wherein each of said arm mounts includes a mounting bracket attached to said body for attachment of said support means thereto.

6. The mounting apparatus of claim 5, wherein said support means comprises an end cap attached to said mounting bracket and a forearm extension having one end attached to said end cap and its other end adapted to support an electronic device.

7. The mounting apparatus of claim 5, wherein said support means includes an end cap, a pair of nested channel members having one end attached to said mounting bracket and its other end attached to said end cap.

8. The mounting apparatus of claim 7, further including a forearm extension having one end attached to said end cap and its other end adapted to support an electronic device.

9. A mounting apparatus for supporting a plurality of electronic devices, said apparatus comprising top and bottom vertically spaced apart mounting plates; a plurality of arm mounts rotationally nested together in collinear alignment between said top and bottom mounting plates; a shield at least partially surrounding said arm mounts, said shield having one end engaged by said top mounting plate and its other end engaged by said bottom mounting plate; and a plurality of support arms having one end thereof coupled to a perspective one of said arm mounts and its other end adapted for supporting an electronic device.

10. The mounting apparatus of claim 9, wherein each of said arm mounts includes a body having a first end and a second end, said first end having a bore therein and said second end having a rod extending therefrom, said rod received within the bore of an underlying adjacent arm mount, and a mounting bracket attached to said body of each of said arm mounts for attachment of said support arm thereto.

11. The mounting apparatus of claim 10, wherein said body includes an opening extending therethrough adjacent said second end, and wherein said rod includes a notch extending therethrough in communication with said opening.

12. The mounting apparatus of claim 10, wherein said top mounting plate includes a first boss extending therefrom and said bottom mounting plate includes a second boss extending therefrom, wherein said top mounting plate is positioned overlying the top most arm mount and said bottom mount is positioned underlying the bottom most arm mount, said first boss received within the bore of an underlying adjacent arm mount and said second boss having a bore therein receiving the rod of an overlying adjacent arm mount.

13. The mounting apparatus of claim 9, further including a pair of rods having one end attached to said bottom mounting plate and its other end attached to said top mounting plate, and wherein said shield includes a pair of spaced apart tubes through which said rods extend between said top and bottom mounting plates.

14. The mounting apparatus of claim 9, wherein said shield has a pair of spaced apart lateral edges functioning as stop members for engagement with said support arms upon rotation of said support arms about said arm mounts.

15. A mounting apparatus for vertically supporting a plurality of electronic devices, said apparatus comprising a plurality of arm mounts rotationally nested into each other in end-to-end collinear alignment, each of said arm mounts comprising a body having a first end and a second end, said first end having a bore therein and said second end having a rod extending therefrom, said rod received within the bore of an underlying adjacent arm mount, a mounting bracket attached to said body of each of said arm mounts adapted for attachment of a support arm thereto, a top mounting plate having a first boss extending therefrom and a bottom mounting plate having a second boss extending therefrom, wherein said top mounting plate is positioned overlying the top most arm mount and said bottom mounting plate is positioned underlying the bottom most arm mount, said first boss received within the bore of an underlying adjacent arm mount and said second boss having a bore therein receiving the rod of an overlying adjacent arm mount and further including an elongated shield at least partially surrounding said nested arm mounts, said shield having one end engaged by said top mounting plate and its other end engaged by said bottom mounting plate.

16. The mounting apparatus of claim 15, further including a pair of rods having one end attached to said bottom mounting plate and its other end attached to said top mounting plate, and wherein said shield includes a pair of spaced apart tubes through which said rods extend between said top and bottom mounting plates.

17. The mounting apparatus of claim 15, wherein said shield includes a pair of spaced apart lateral edges functioning as stop members for engagement with the support arm upon rotation of the support arm about said arm mounts.

18. A mounting apparatus for supporting a plurality of electronic devices in a vertical orientation, said apparatus comprising a top mounting plating having a downwardly depending hollow boss; a bottom mounting plate vertically spaced from said top mounting plate having an upwardly depending boss; a plurality of arm mounts vertically nested together in collinear alignment between said top and bottom mounting plates forming a nested column thereof, each said arm mount including a hollow body and a downwardly depending rod, said rod having a notch extending therethrough in communication with an opening extending through an adjacent portion of said body of said arm mount, said notch and said opening adapted to permit passage of a cable therethrough extending from an electronic device mounted to said apparatus, wherein a plurality of said arm mounts are rotationally nested with respect to each other by said rod of one arm mount being received with the hollow body of an underlying arm mount, said rod of a first one of said arm mounts in the nested column being rotationally received within the hollow boss of said bottom mounting plate and said boss of said top mounting plate rotationally being received with said hollow body of a last one of said arm mounts in the nested column; a shield extending between said top and bottom mounting plates at least partially surrounding said plurality of arm mounts; and a plurality of rods extending between said top and bottom mounting plates for securing said mounting plates, said shield and said plurality of arm mounts in assembled relationship; and a plurality of support arms having one end thereof coupled to a respective one of said arm mounts and its other end adapted for supporting said electronic device.

19. The mounting apparatus of claim 18, wherein said shield has a pair of spaced apart lateral edges functioning as stop members for engagement with said support arms upon rotation of said support arms about said arm mounts.

20. The mounting apparatus of claim 18, wherein said support arm comprises an end cap, a pair of nested channel members having one end attached to said mounting bracket and its other end attached to said end cap.

21. The mounting apparatus of claim 20, further including a forearm extension having one end attached to said end cap and its other end adapted to support an electronic device.

22. The mounting apparatus of claim 21, further including a tilter assembly attached to the other end of said forearm extension to which said electronic device is attached thereto.

23. A method of making a mounting apparatus for supporting a plurality of electronic devices, said method comprising nesting a plurality of arm mounts in end-to-end rotational relationship; securing said plurality of arm mounts in a nested vertical column, wherein said securing comprises attaching the top most arm mount to a top mounting plate and the bottom most arm mount to a bottom mounting plate, and attaching a shield at least partially surrounding said plurality of arm mounts between said top and bottom mounting plates; and attaching a supporting arm to each of said arm mounts for attaching an electronic device at one end thereof.

24. The method of claim 23, wherein each of said arm mounts includes a body having a first end and a second end, said first end having a bore therein and said second end having a rod extending therefrom, said nesting comprising inserting said rod in the bore of an underlying adjacent arm mount.

25. The method of claim 24, wherein said body includes an opening extending therethrough adjacent said second end and wherein said rod includes a notch extending therethrough in communication with said opening.

26. The method of claim 23, further including attaching said top and bottom mounting plates together by a pair of rods having one end attached to said top mounting plate and its other end attached to said bottom mounting plate.

27. The method of claim 23, further including attaching said bottom mounting plate to a supporting surface.

28. The method of claim 24, further including forming a cable passageway through said arm mounts by providing a through slot within said rod in communication with a through opening in an adjacent portion of said second end of said body of said arm mounts.

29. A method of making a mounting apparatus for supporting a plurality of electronic devices, said method comprising providing a plurality of arm mounts, each of said arm mounts including a body having a first end and a second end, said first end having a bore therein and said second end having a rod extending therefrom; nesting said arm mounts together in end-to-end relationship by inserting a rod from one arm mount into the bore of an underlying adjacent arm mount; securing the nested arm mounts together in a vertical column, wherein said securing comprises attaching the top most arm mount to a top mounting plate and the bottom most arm mount to a bottom mounting plate, and attaching a shield at least partially surrounding said plurality of arm mounts between said top and bottom mounting plates; and attaching a support arm to each of said arm mounts for attaching an electronic device thereto.

30. The method of claim 29, further including attaching said top and bottom mounting plates together by a pair of rods having one end attached to said top mounting plate and its other end attached to said bottom mounting plate.

31. The method of claim 29, further including forming a cable passageway through said arm mounts by providing a through slot within said rod in communication with a through opening in an adjacent portion of said second end of said body of said arm mounts.

32. A method of making a mounting apparatus for supporting a plurality of electronic devices, said method comprising nesting a plurality of arm mounts in end-to-end rotational relationship; securing said plurality of arm mounts in a nested vertical column; attaching a supporting arm to each of said arm mounts for attaching an electronic device at one end thereof, wherein each of said arm mounts includes a body having a first end and a second end, said first end having a bore therein and said second end having a rod extending therefrom; wherein said nesting comprises inserting said rod in the bore of an underlying adjacent arm mount; and forming a cable passageway through said arm mounts by providing a through slot within said rod in communication with a through opening in an adjacent portion of said second end of said body of said arm mounts.

33. A method of making a mounting apparatus for supporting a plurality of electronic devices, said method comprising providing a plurality of arm mounts, each of said arm mounts including a body having a first end and a second end, said first end having a bore therein and said second end having a rod extending therefrom; nesting said arm mounts together in end-to-end relationship by inserting a rod from one arm mount into the bore of an underlying adjacent arm mount; securing the nested arm mounts together in a vertical column; attaching a support arm to each of said arm mounts for attaching an electronic device thereto; and forming a cable passageway through said arm mounts by providing a through slot within said rod in communication with a through opening in an adjacent portion of said second end of said body of said arm mounts.

* * * * *